(12) United States Patent
Barsness et al.

(10) Patent No.: US 10,162,731 B2
(45) Date of Patent: *Dec. 25, 2018

(54) CONDITIONAL BREAKPOINT ON CALL STACK DURING DEBUGGING AT RUNTIME

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/413,341

(22) Filed: Jan. 23, 2017

(65) Prior Publication Data

US 2018/0210812 A1 Jul. 26, 2018

(51) Int. Cl.
*G06F 9/44* (2018.01)
*G06F 11/36* (2006.01)

(52) U.S. Cl.
CPC ...... *G06F 11/3632* (2013.01); *G06F 11/3636* (2013.01)

(58) Field of Classification Search
CPC .................................................. G06F 11/3632
USPC ................... 717/123–130, 140–141
See application file for complete search history.

(56) References Cited

U.S. PATENT DOCUMENTS

| 5,794,047 | A  | * | 8/1998 | Meier | G06F 9/547 709/203 |
| 6,721,941 | B1 | * | 4/2004 | Morshed | G06F 11/3612 709/217 |
| 6,826,746 | B2 | * | 11/2004 | Evans | G06F 11/362 714/E11.21 |
| 7,133,820 | B2 | * | 11/2006 | Pennello | G06F 11/3636 703/22 |
| 7,191,433 | B2 | * | 3/2007 | Narad | H04L 45/16 717/140 |
| 7,343,588 | B2 | * | 3/2008 | Bates | G06F 11/362 714/E11.207 |
| 7,367,023 | B2 | * | 4/2008 | Adolphson | G06F 8/4434 717/142 |
| 7,401,323 | B2 |   | 7/2008 | Stall et al. | |
| 7,735,069 | B2 |   | 6/2010 | Bustelo et al. | |
| 7,882,492 | B2 | * | 2/2011 | Viswanadha | G06F 11/3664 717/124 |

(Continued)

OTHER PUBLICATIONS

Zhang et al, "BPGen: An Automated Breakpoint Generator for Debugging", ACM, pp. 271-274, 2010.*

(Continued)

*Primary Examiner* — Anil Khatri
(74) *Attorney, Agent, or Firm* — Patterson + Sheridan, LLP (57) ABSTRACT

A method for debugging and executable is disclosed herein. The method begins by receiving one or more breakpoints defining one or more attributes of a call stack in the executable. The processor receives the executable in a debug environment. The processor executes the executable in the debug environment. The processor halts execution of the executable upon detection of a breakpoint contained in the executable.

14 Claims, 8 Drawing Sheets

(56) References Cited

U.S. PATENT DOCUMENTS

| | | | | |
|---|---|---|---|---|
| 8,291,381 | B2* | 10/2012 | Lai | G06F 9/4484 |
| | | | | 717/124 |
| 8,301,868 | B2* | 10/2012 | Newburn | G06F 11/348 |
| | | | | 712/220 |
| 8,392,885 | B2* | 3/2013 | Stall | G06F 11/3644 |
| | | | | 714/38.1 |
| 8,522,213 | B2 | 8/2013 | Fuhrer et al. | |
| 8,756,570 | B2* | 6/2014 | Wegmann | G06F 11/3664 |
| | | | | 717/124 |
| 8,769,502 | B2* | 7/2014 | Heidasch | G06F 11/36 |
| | | | | 717/124 |
| 8,856,742 | B2* | 10/2014 | Branda | G06F 11/3664 |
| | | | | 717/124 |
| 9,916,232 | B2* | 3/2018 | Voccio | G06F 11/3612 |
| 2014/0282417 | A1 | 9/2014 | Paveza et al. | |
| 2015/0199259 | A1 | 7/2015 | Paveza et al. | |
| 2015/0199260 | A1 | 7/2015 | Deckert et al. | |

OTHER PUBLICATIONS

Yin et al, "A Pointcut Language for Setting Advanced Breakpoints", ACM, pp. 145-156, 2013.*

Iqbal et al, "Understanding and Developing Models for Detecting and Differentiating Breakpoints during Interactive Tasks", ACM, pp. 697-706, 2007.*

Chen et al, "Software Design and Implementation of Data Breakpoint in Embedded System", IEEE, pp. 1726-1729, 2012 (Year: 2012).*

Koch et al, "Breakpoints and Breakpoint Detection in Source Level Emulation", IEEE, pp. 26-31, 1996 (Year: 1996).*

Thane et al, "Replay Debugging of Real-Time Systems Using Time Machines", IEEE, pp. 1-8, 2003 (Year: 2003).*

Barton et al, "Dynamic and Graphical Web Page Breakpoints", ACM, pp. 81-90, 2010 (Year: 2010).*

Barton, John J., et al., "Dynamic and Graphical Web Page Breakpoints," Proceedings of the 19th International Conference on World Wide Web, pp. 81-90, ACM, 2010.

\* cited by examiner

CONDITIONAL BREAKPOINT ON CALL STACK DURING DEBUGGING AT RUNTIME

BACKGROUND

The present disclosure generally relates to debugging an executable at runtime, and more specifically to, providing breakpoints related to call stacks in the executable.

An issue in developing software is that the quality of code is dependent on many factors, such as the skill level of the developers, the quality of testing, and the sufficient time to test every path of code. In today's competitive market, the time to design, generate, and test code is constantly shrinking, while the time to remediate issues within the code is becoming increasingly more critical. There is a need to provide better tools to help developers speed up the diagnostic process and to help developers become more proactive at looking for potential problem areas before issues arise in the field.

Often setting a simple breakpoint at a line of code results in the breakpoint being hit more frequently than desired until the issue that is trying to be resolved is met. Conditional breakpoints aid in improving simple breakpoints by allowing the debugger to skip over the breakpoint based on some described condition.

SUMMARY

Embodiments described herein provide a method, system, and computer readable medium configured to debug an executable. The method begins by receiving one or more breakpoints defining one or more attributes a call stack in the executable. The processor receives an executable in a debug environment. The processor executes the executable in the debug environment. The processor halts execution of the executable upon detection of a breakpoint contained in the executable.

DETAILED DESCRIPTION

Embodiments described herein provide a method, system, and computer readable medium configured to debug an executable. The method begins by receiving one or more breakpoints related to a call stack in the executable. The processor receives an executable in a debug environment. The processor executes the executable in the debug environment. The processor halts execution of the executable upon detection of a breakpoint contained in the executable.

Figure 1:
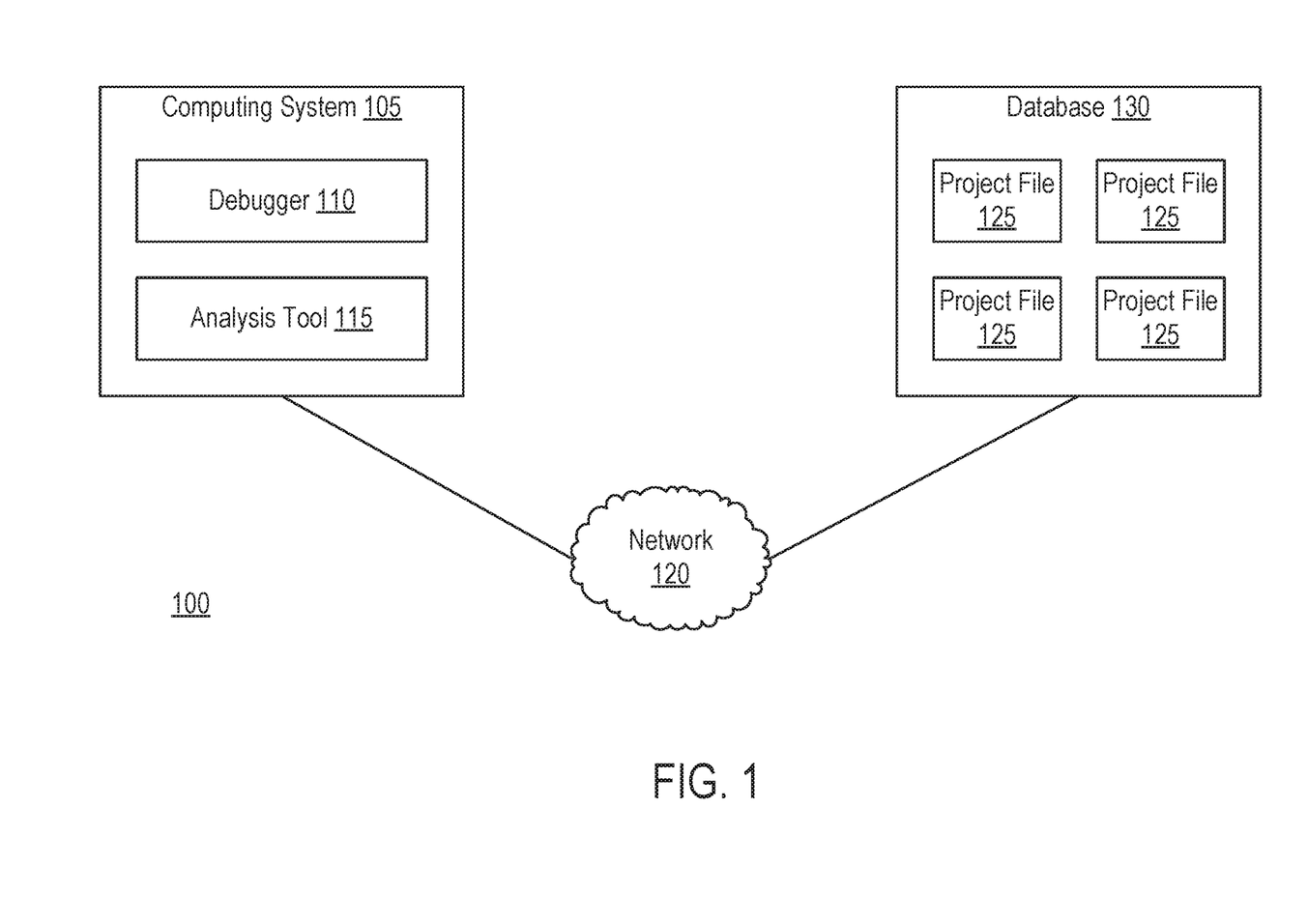
FIG. 1 is an example computing environment, according to one embodiment disclosed herein.

FIG. 1 illustrates a computing environment 100, according to one embodiment. For example, the computing environment 100 includes a computing system 105, a network 120, and a database 130 for storing one or more project files 125. Illustratively, the computing system 105 includes a debugger 110 and an analysis tool 115.

The debugger 110 is an application generally configured to test and/or debug other executables, such as one of the project files 125 in database 130. The debugger 110 allows the developer to diagnose and correct problems that occur during runtime. For example, a developer can user the debugger 110 to insert breakpoints at a location in a program where the program crashes or where the program does not produce the correct results.

The analysis tool 115 is an application that may be launched by the debugger when a breakpoint is hit. The analysis tool 115 is configured to gather relevant information relating to errors and problems identified during runtime of the executable up to the breakpoint. For example, the analysis tool 115 may gather information related to memory errors, such as uninitialized memory access, buffer overflow, and improper freeing of memory. The analysis tool 115 may also gather information related to system type, software levels, PTF levels, CPU speeds, memory size, and the like. Such information aids in narrowing down problems where a problem is only seen on a certain machine type configuration.

In the computing environment 100, the analysis tool 115 works with the debugger 110 to assist developers in zeroing in on potential issues that may be causing a problem the developer is trying to debug. In the present application, the analysis tool 115 may be launched when the debugger 110 sees a certain call stack. In one embodiment, the analysis tool 115 may be launched when the debugger 110 encounters a pre-defined call stack. For example, the debugger 110 may analyze each call stack in the executable on a component by component basis. The debugger 110 may then break execution when the debugger 110 detects that each component of a given call stack in the executable matches each component of the call stack defined as the breakpoint.

In another embodiment, the analysis tool 115 may be launched when the debugger 110 encounters a certain process flow, pattern, or subset of a component within a call stack, i.e. A calling B. For example, the debugger 110 may analyze one or more components of a call stack in the executable to determine whether the call stack contains a process flow, pattern, or subset of components that matches the process flow, pattern, or subset of components in the call stack as defined as the breakpoint.

In yet another embodiment, the analysis tool 115 may be launched when the debugger 110 encounters a specific process flow belonging to a pre-set class. For example, the debugger 110 may analyze each call stack in the executable on a component by component basis to first determine whether the call stack matches a call stack defined as the breakpoint. The debugger 110 may then determine the class to which the call stack belongs. In some embodiments, the breakpoint may be such that the debugger 110 only breaks on call stacks that match the breakpoint and are members of the base class. In other embodiments, the debugger 110 may only analyze each all stack to determine to which each call stack belongs. If, for example, the call stack belongs to the base class, the breakpoint may be such that the debugger halts execution.

In another embodiment, the analysis tool 115 may be launched when the debugger 110 encounters one or more object-oriented concepts. For example, the one or more object-oriented concepts may include certain abstractions, extended classes, and interfaces within a given call stack. The debugger 110 may analyze the executable on a call stack by call stack basis to determine whether the executable includes a call stack having one or more object-oriented concepts.

Figure 2:
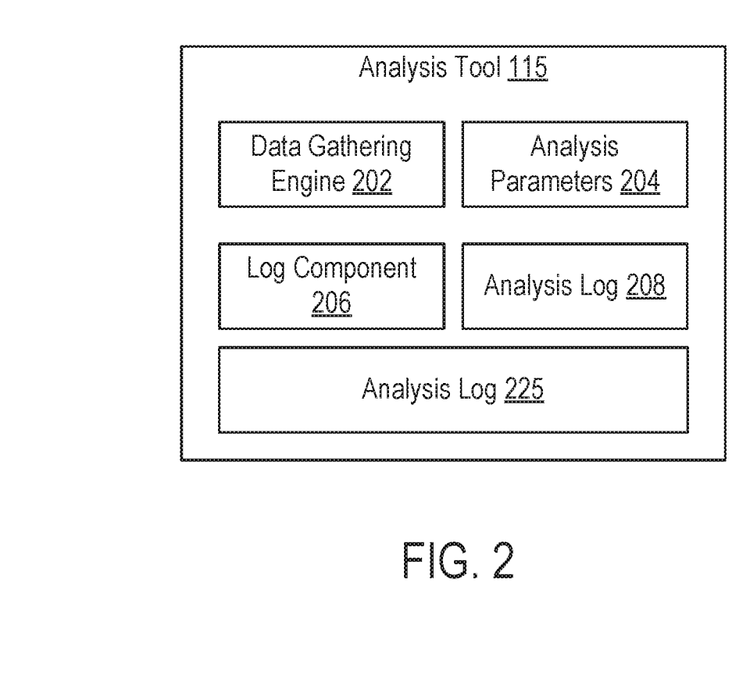
FIG. 2 illustrates the analysis tool of FIG. 1, according to one embodiment disclosed herein.

FIG. 2 illustrates the analysis tool 115, according to one embodiment. As shown, the analysis tool 115 includes a data gathering engine 202, analysis parameters 204, an analysis log component 206, and an analysis log 208. The analysis parameters 204 include one or more parameters to be gathered by the analysis tool 115 when triggered by the detection of one or more call stacks that are set as breakpoints by the debugger 110. For example, the analysis parameters may include information related to bugger overflows, the improper freeing of memory, system type, software levels, PTF levels, CPU speeds, memory size, and the like The data gathering engine 202 gathers the relevant information related to the execution of the program file up to the breakpoint. For example, the data gathering engine 202 gathers information as specified in the analysis parameters 204. For example, the data gathering engine 202 may be configured to only gather information related to buffer overflows or the improper freeing of memory. The analysis log component 206 logs the information gathered by the data gathering engine 202 in the analysis log 225 to be transmitted to the debugger.

Figure 3:
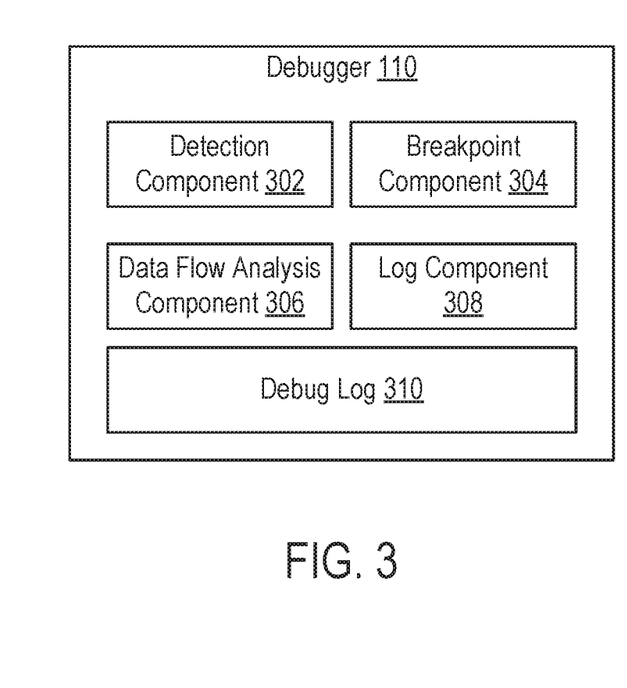
FIG. 3 illustrates the debugger of FIG. 1, according to one embodiment disclosed herein.

FIG. 3 illustrates the debugger 110, according to one embodiment. As shown, the debugger 110 includes a detection component 302, a breakpoint component 304, a data flow analysis component 306, a log component 308, and a debug log 310. The detection component 302 receives the data gathered by the data gathering engine 202 of the analysis tool 115. The log component 308 records the errors found by the data gathering engine 202 in the debug log 310 for the currently executing routine. The breakpoint component 304 allows the user to set breakpoints in the detection component 302. In one example, the user sets a pre-defined call stack as a breakpoint in the breakpoint component 304. In another example, the user sets a certain process flow within a call stack, i.e. A calling B, as a breakpoint in the breakpoint component 304. In yet another example, the user sets a specific process flow belonging to a pre-set family as a breakpoint in the breakpoint component 304. The call stack or process flow definitions are used to define the event(s) that trigger the breakpoint to be invoked. In some embodiments, the form of input may be through a user interface. In other embodiments, the form of input could be through a command line prompt.

Alternatively, in some embodiments, the debugger 110 may include the analysis tool 115. Thus, rather than transferring control from the debugger 110 to the analysis tool 115 upon detection of a breakpoint, control may be transferred within the debugger 110 from the detection component 302 to the data gathering engine 202 in the analysis tool 115.

Figure 4:
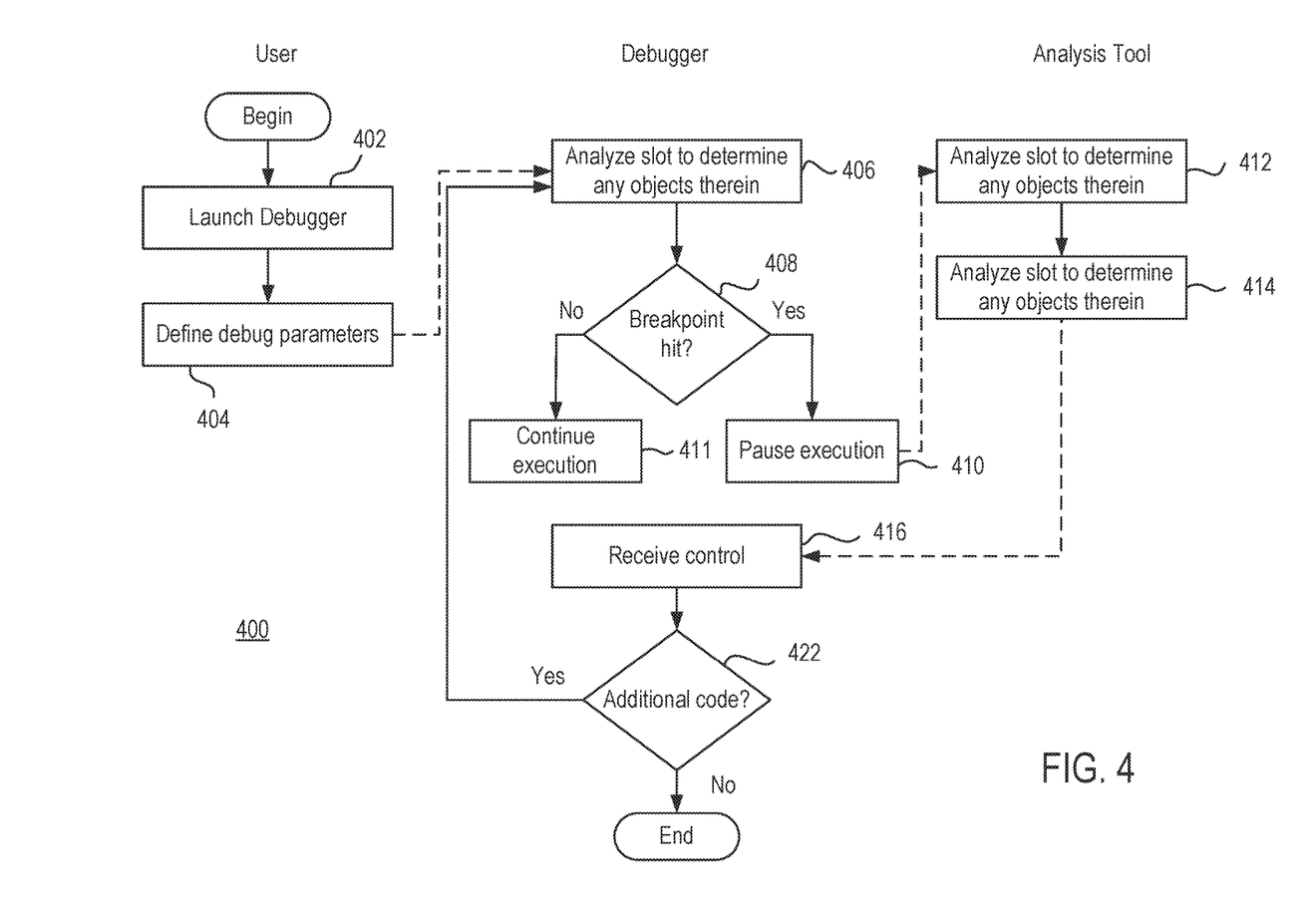
FIG. 4 illustrates a method of debugging a program, according to one embodiment disclosed herein.

FIG. 4 illustrates a method 400 of debugging a program, according to one embodiment. At step 402, the debugger 110 is launched. At step 404, the debug parameters are defined in the debugger. For example, a programmer or developer may use the breakpoint components 304 to specify breakpoints at which the execution of the executable should be temporarily paused. Such breakpoints can be unconditional or depend on a set of conditions (e.g., halt on reaching an instruction if a given variable has a specified value).

At step 406, the executable runs in the debugger. The executable runs in the debugger until a breakpoint is hit. For example, the breakpoint may be a pre-defined call stack. In another example, the breakpoint may be a certain process flow within a call stack, i.e. A calling B. In yet another example, the breakpoint may be a specific process flow belonging to a pre-set family. At step 408, the debugger 110 determines whether a breakpoint is hit. The debugger 110 determines whether a breakpoint is hit by monitoring execution of the executable. In one embodiment, the debugger 110 monitors each call stack of the executable, searching for the breakpoint that defines one or more attributes of a call stack in the executable. For example, FIGS. 5-8 illustrate methods for determining whether a breakpoint is hit, based on the various types of breakpoints that are defined in step 404. If a breakpoint is hit, then at step 410 the executable is paused, and the analysis tool 115 is launched. If a break point was not hit, then at step 411, execution continues.

At step 412, the analysis tool 115 receives control from the debugger 110. At step 414, the analysis tool 115 collects the relevant information defined by the programmer or developer. For example, at step 414, which may be performed prior to executing the executable in the debugger or before gathering information using the analysis tool, the analysis tool 115 may receive one or more analysis parameters 204 from the developer. The analysis parameters 204 include one or more parameters to be gathered by the analysis tool 115 when triggered by the exit program. For example, the analysis parameters 204 may include one or more variables, such as CPU speeds, memory usage, memory errors, and the like as relevant information to be gathered.

The debugger 110 receives control back from the analysis tool 115 (step 416). At step 422, the debugger 110 determines whether there is additional code in the executable to run. If there is additional code in the executable, the method 400 reverts to step 406 for continued execution. If, however, there is no remaining code, then the method 400 ends.

Figure 5:
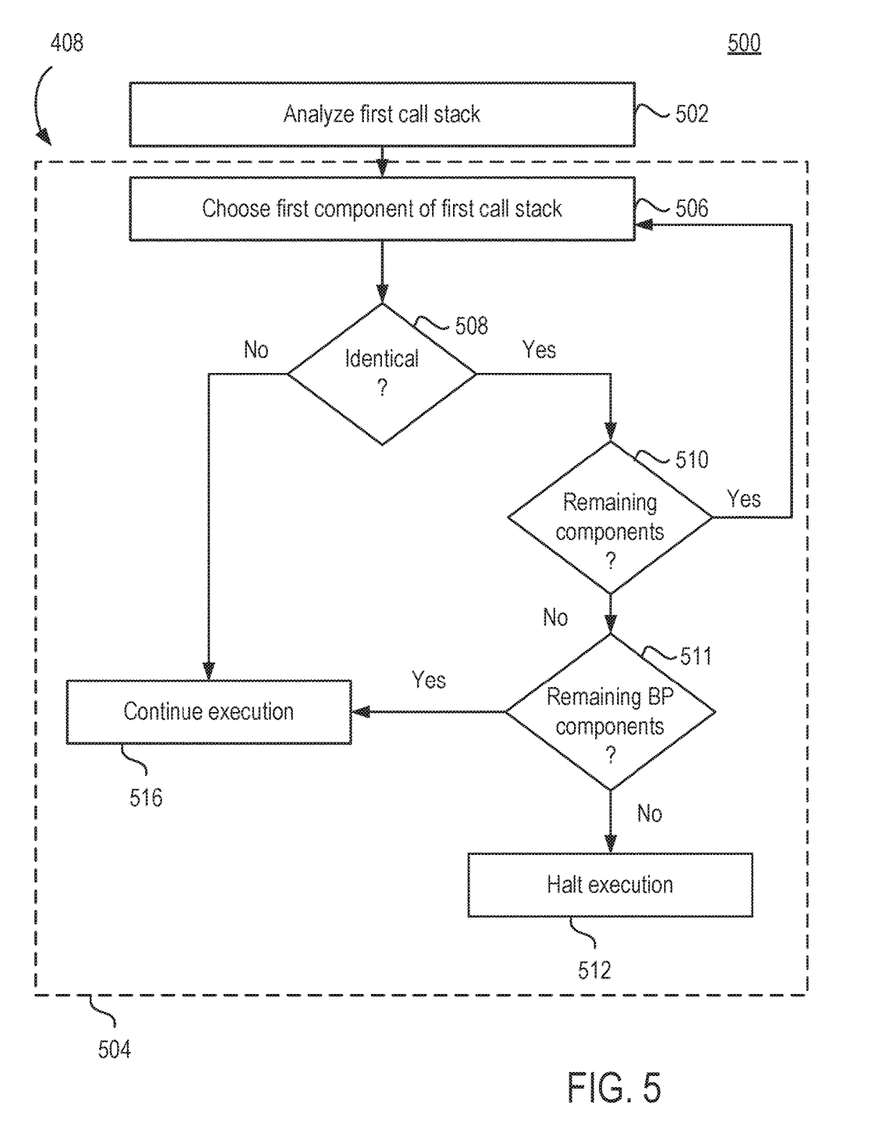
FIG. 5 is a flow chart illustrating a sub-step of FIG. 4 in greater detail, according to one embodiment disclosed herein.

FIG. 5 is a flow chart 500 illustrating step 408 in greater detail, according to one embodiment. At step 502, the debugger 110 analyzes a first call stack in the executable. The debugger 110 determines whether the first call stack is the breakpoint defined by the user (step 504). For example, the breakpoint defined by the user is a specific call stack, in which each element of the call stack must be met for the breakpoint to be met. The debugger 110 chooses a first component of the call stack (step 506). The debugger 110 determines whether the first component of the call stack is identical to the first component of the breakpoint specified by the user (step 508). If the first component of the call stack is identical to the first component of the breakpoint, the debugger 110 determines whether there are any remaining components in the call stack (step 510). If there are remaining components in the call stack, the flow chart 500 reverts to step 506, and the debugger 110 chooses a next component of the call stack. If there are no remaining components in the call stack, the debugger determines whether there are any remaining components in the breakpoint (step 511). If there are not any remaining components in the breakpoint, then at step 512 execution of the executable is halted because the breakpoint was triggered. If there are remaining components in the breakpoint, then at step 516 execution of the executable is continued because a breakpoint has not been reached. Referring back to step 508, if the first component of the call stack is not identical to the first component of the breakpoint, the executable continues to execute in the debug environment.

Figure 6:
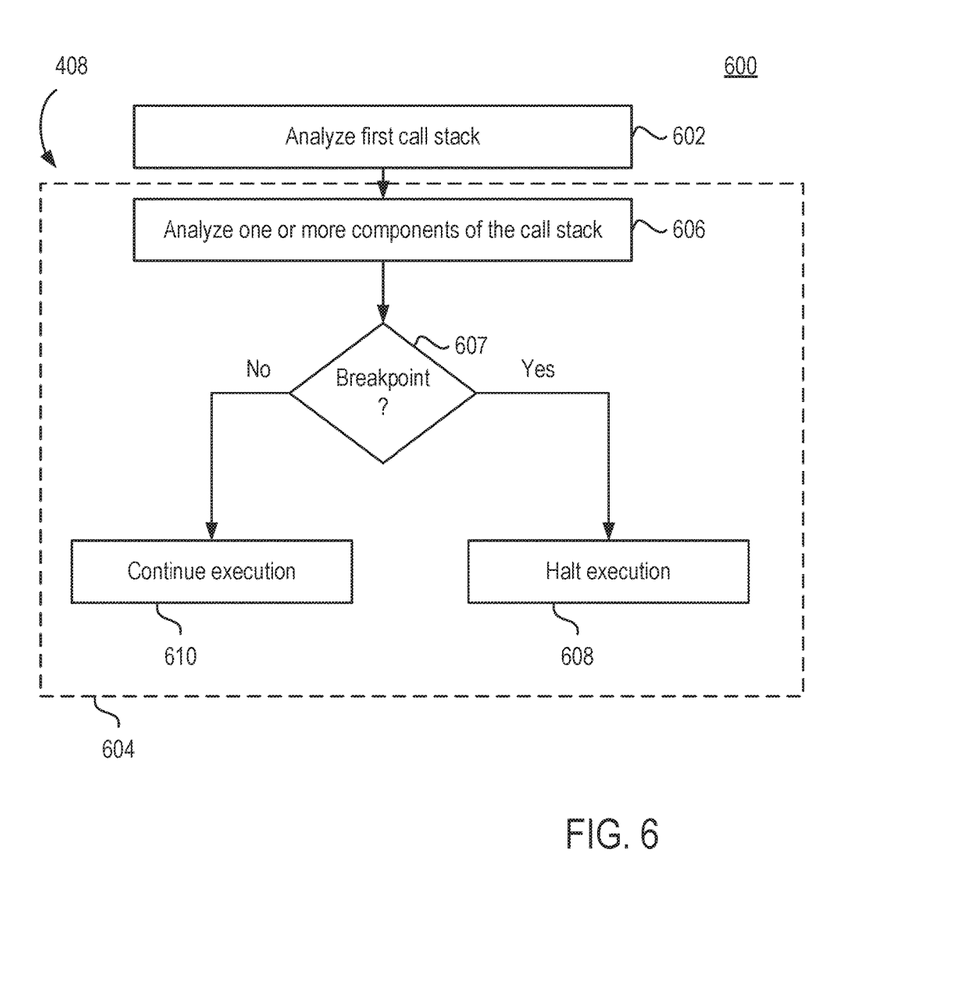
FIG. 6 is a flow chart illustrating a sub-step of FIG. 4 in greater detail, according to one embodiment disclosed herein.

FIG. 6 is a flow chart 600 illustrating step 408 in greater detail, according to one embodiment. At step 602, the debugger 110 analyzes a first call stack in the executable. The debugger 110 determines whether the first call stack includes the breakpoint defined by the user (step 604). For example, the breakpoint defined by the user is a certain pattern, or subset of components of a call stack. As such, the breakpoint is met when the pattern, or subset, is met. The debugger 110 analyzes the one or more components of the first call stack (step 606). At step 607, the debugger determines whether the one or more components include the pattern or subset defined as the breakpoint. If the one or more components of the first call stack include the pattern, or subset of components, of the breakpoint, then at step 608 execution of the executable is halted because the breakpoint has been reached. If, however, at step 610 the one or more components of the first call stack does not include the pattern, or subset of components, of the first call stack, then execution of the executable continues.

Figure 7:
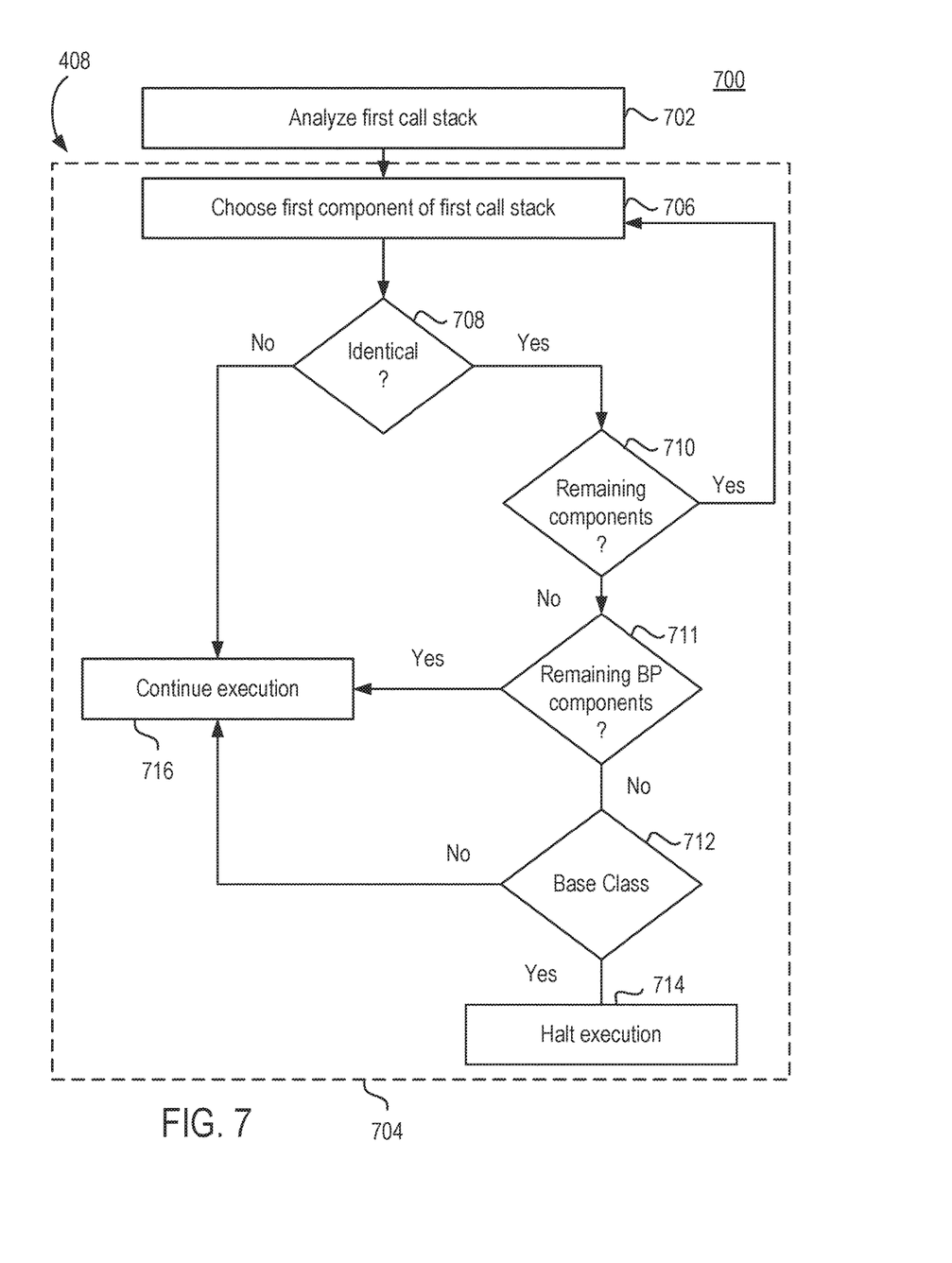
FIG. 7 is a flow chart illustrating a sub-step of FIG. 4 in greater detail, according to one embodiment disclosed herein.

FIG. 7 is a flow chart 700 illustrating step 408 in greater detail, according to one embodiment. At step 702, the debugger 110 analyzes a first call stack in the executable. The debugger 110 determines whether the first call stack includes the breakpoint defined by the user (step 704). In this embodiment, breakpoint defined by the user is a specific call stack or a subset of a call stack within a base class. For example, the debugger 110 will break on a specific call stack within a base class, but not on the call tack in an inherited class of the base class. In general, inheritance is when an object or class is based on another object or class, using the same implementation or specifying a new implementation to maintain the same behavior. Such an inherited class may be referred to as a subclass of the parent, or base, class.

The debugger 110 chooses a first component of the call stack (step 706). The debugger 110 determines whether the first component of the call stack is identical to the first component of the breakpoint specified by the user (step 708). If the first component of the call stack is identical to the first component of the breakpoint, the debugger 110 determines whether there are any remaining components in the call stack (step 710). If there are remaining components in the call stack, the flow chart 700 reverts to step 706, and the debugger 110 chooses a next component of the call stack. If there are not any remaining components in the call stack, the debugger 110 determines whether there are any remaining components in the breakpoint (step 711). If there are not any remaining components in the breakpoint, then at step 712, the debugger 110 determines if the call stack is a member of the parent class or an inherited class. If the call stack is a member of the base class, execution of the executable is halted because the breakpoint was triggered (step 714). If, however, the call stack is a member of an inherited class, execution of the executable continues because the breakpoint was not triggered (step 716).

If there are remaining components in the breakpoint, then at step 716 execution of the executable is continued because a breakpoint has not been reached. Referring back to step 708, if the first component of the call stack is not identical to the first component of the breakpoint, the executable continues to execute in the debug environment.

Figure 8:
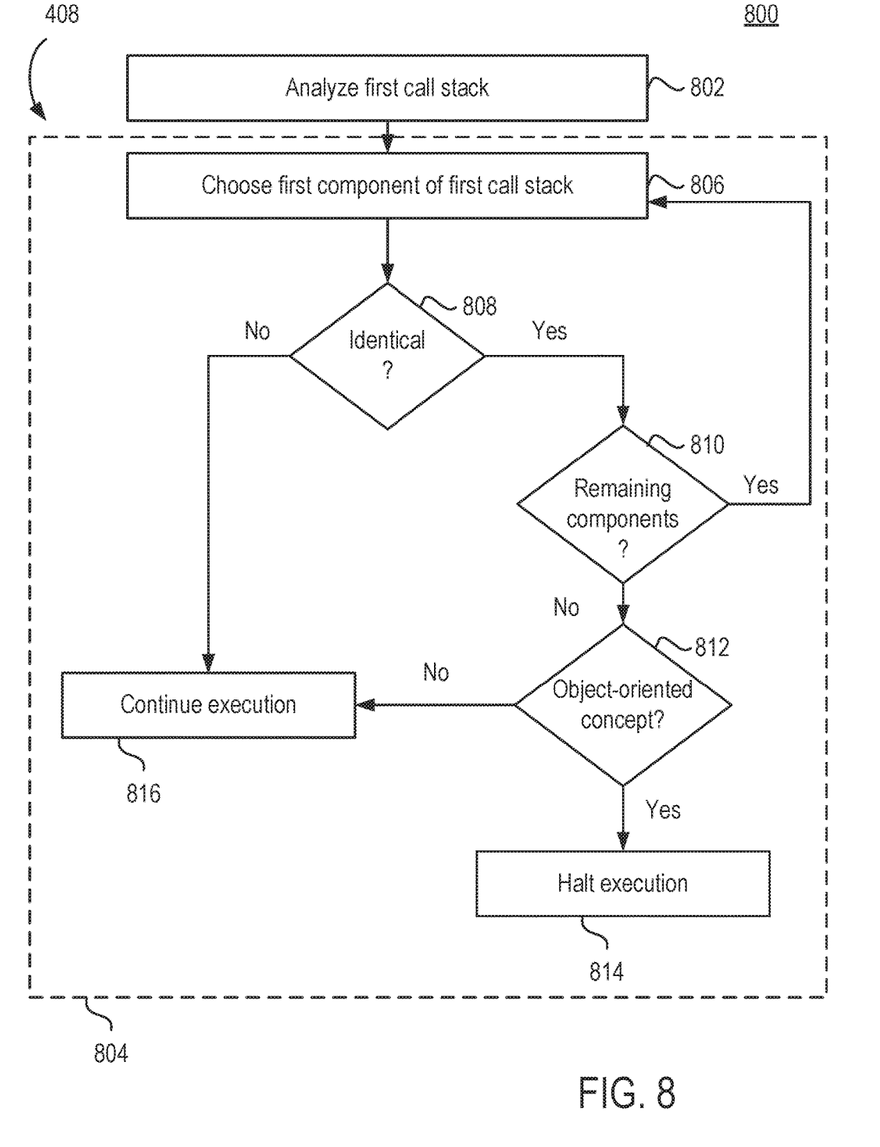
FIG. 8 is a flow chart illustrating a sub-step of FIG. 4 in greater detail, according to one embodiment disclosed herein.

FIG. 8 is a flow chart 800 illustrating step 408 in greater detail, according to one embodiment. At step 802, the debugger 110 analyzes a first call stack in the executable. The debugger 110 determines whether the first call stack includes the breakpoint defined by the user (step 804). In this embodiment, breakpoint defined by the user is a specific call stack that includes object-oriented concepts. For example, the defined object-oriented concepts may include abstractions, extended classes, and interfaces to match the given call stack. In one example, the debugger 110 would either allow or disallow a call stack entry to match a predefined call stack if the call stack being debugged is an extended class, multiple levels of extended classes, overridden through abstraction, or the like.

The debugger 110 chooses a first component of the call stack (step 806). The debugger 110 determines whether the first component of the call stack is identical to the first component of the breakpoint specified by the user (step 808). If the first component of the call stack is identical to the first component of the breakpoint, the debugger 110 determines whether there are any remaining components in the call stack (step 810). If there are remaining components in the call stack, the flow chart 800 reverts to step 806, and the debugger 110 chooses a next component of the call stack. If there are not any remaining components in the call stack, the debugger 110 determines whether there are any remaining components in the breakpoint. If there are not any remaining components in the breakpoint, then at step 812, the debugger 110 determines if the call stack includes one or more object-oriented concepts defined by the user. If the call stack includes the one or more object-oriented concepts, execution of the executable is halted because the breakpoint was triggered (step 814). If, however, the call stack does not include the one or more object-oriented concepts, execution of the executable continues because the breakpoint was not triggered (step 816).

If there are remaining components in the breakpoint, then at step 816 execution of the executable is continued because a breakpoint has not been reached. Referring back to step 808, if the first component of the call stack is not identical to the first component of the breakpoint, the executable continues to execute in the debug environment.

In another embodiment, the methods discussed in FIGS. 4-8 may be performed by a single debugger 110 having an analysis tool contained therein. As such, instead of transferring control debugger 110 and the analysis tool 115, will transfer control within the debugger 110 to a data gathering engine similar to data gathering engine 202.

Figure 9:
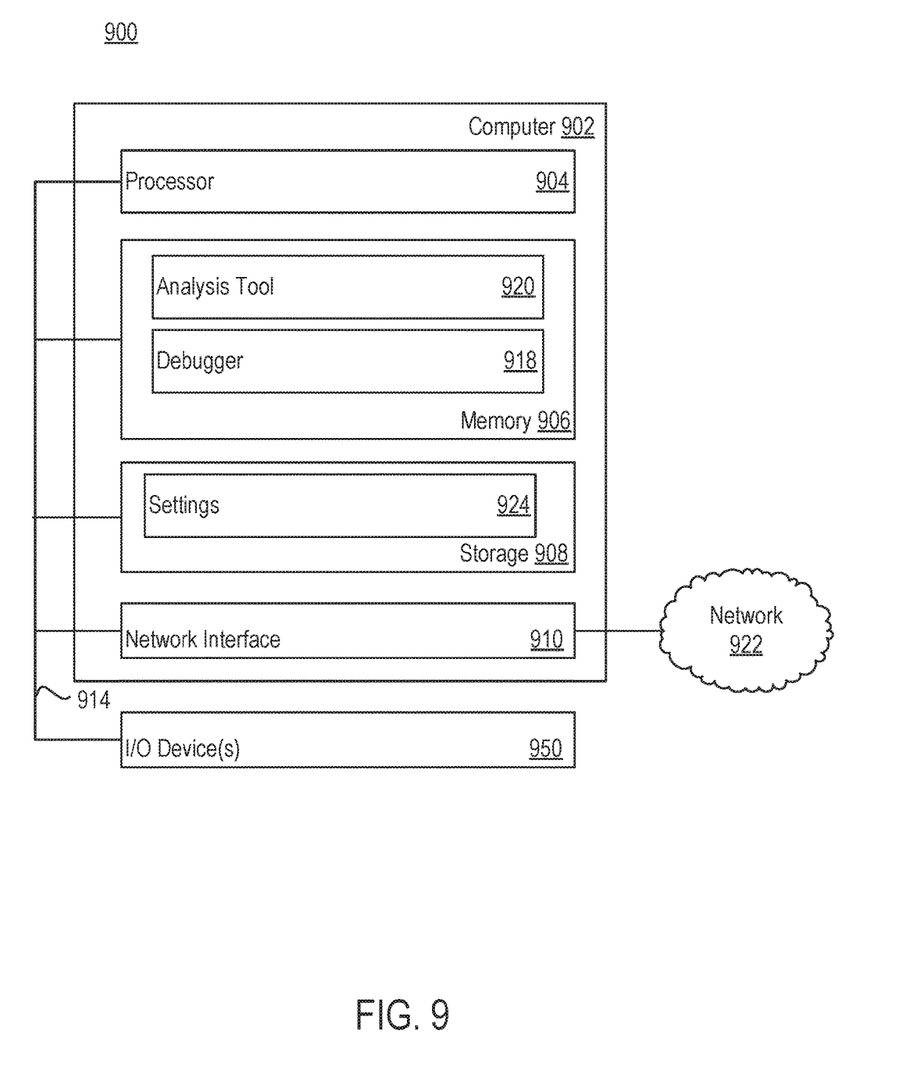
FIG. 9 is an example computing system, according to one embodiment disclosed herein.

FIG. 9 illustrates an example computing system 900, according to one embodiment. As shown, the computing system 900 includes a computer 902 having a central processing unit (CPU) 904, a memory 906, storage 908, and a network interface 910, each connected to a bus 914. The computer 902 may be in communication with one or more I/O devices 950. Note, CPU 904 is included to be representative of a single CPU, multiple CPUs, a single CPU having multiple processing cores, and the like. The memory 906 is generally included to be representative of a random access memory. The storage 908 may be a disk drive storage device. Although shown as a single unit, the storage 908 may be a combination of a fixed and/or removable storage, such as fixed disc drives, removable memory cards, optical storage, network attached storage (NAS), or storage-area-network (SAN). The storage 908 may include settings 924. The network interface 910 may be any type of network communications allowing the computing system 900 to communicate with other computers via the network 922.

The memory 906 further includes a debugger 918 and an analysis tool 920. The debugger 918 is an application generally configured to rets and/or debug other executables. The debugger 918 allows the developer to pinpoint anomalies that occur during runtime. For example, the debugger 918 can insert breakpoints at instances where a given processing element crashes, sends data to an unintended target processing element, etc.

The analysis tool 920 is an application that may be launched by the debugger 918 when a breakpoint is hit. The analysis tool 920 is configured to gather relevant information relating to errors and problems identified during runtime of the executable up to the breakpoint. For example, the analysis tool 920 may gather information related to memory errors, such as uninitialized memory access, buffer overflow, and improper freeing of memory. The analysis tool 920 may also gather information related to system type, software levels, PTF levels, CPU speeds, memory size, and the like. Such information aids in narrowing down problems where a problem is only seen on a certain machine type configuration.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

While the foregoing is directed to embodiments of the present invention, other and further embodiments of the invention may be devised without departing from the basic scope thereof, and the scope thereof is determined by the claims that follow.

What is claimed is:

1. A method for debugging an executable, comprising:
receiving one or more breakpoints defining one or more object-oriented concepts within a call stack;
receiving the executable in a debug environment;
executing the executable in the debug environment;
during execution of the executable, analyzing a first call stack corresponding to the execution of the executable;
determining that the first call stack includes an object-oriented concept that satisfies a first breakpoint of the one or more breakpoints,
wherein the first breakpoint specifies at least one of an abstraction, an extended class and an interface;
halting execution of the executable upon detection of the object-oriented concept defined by the first breakpoint within the first call stack; and
analyzing the executable up to the location of the first breakpoint based on one or more analysis parameters.

2. The method of claim 1, further comprising:
halting execution of the executable upon detection of a second breakpoint contained in the executable, comprising:
analyzing a second call stack in the executable;
determining whether each component of the second call stack is identical to each component of the second breakpoint; and
halting execution of the executable responsive to determining that each component of the second call stack is identical to each component of the second breakpoint.

3. The method of claim 1, further comprising:
halting execution of the executable upon detection of a second breakpoint contained in the executable, comprising:
analyzing a second call stack in the executable;
determining whether the second call stack includes a call stack pattern defined as the second breakpoint; and
halting execution of the executable responsive to determining that the second call stack includes the call stack pattern.

4. The method of claim 1, further comprising:
halting execution of the executable upon detection of a second breakpoint contained in the executable, comprising:
analyzing a second call stack in the executable;
determining whether the second call stack matches at least a component of the second breakpoint, where the second breakpoint specifies that execution will halt on a specific call stack within a base class; and
halting execution of the executable responsive to determining that the second call stack contains at least a component of the second breakpoint and is within the base class.

5. The method of claim 1, further comprising:
transferring control from the debug environment to an analysis tool.

6. A system, comprising
a computer processor; and
a memory containing a program that, when executed on the computer processor, performs an operation, comprising:
receiving one or more breakpoints defining one or more object-oriented concepts within a call stack;

receiving the executable in a debug environment;
executing the executable in the debug environment;
during execution of the executable, analyzing a first call stack corresponding to the execution of the executable;
determining that the first call stack includes an object-oriented concept that satisfies a first breakpoint of the one or more breakpoints,
wherein the first breakpoint specifies at least one of an abstraction, an extended class and an interface;
halting execution of the executable upon detection of the object-oriented concept defined by the first breakpoint within the first call stack; and
analyzing the executable up to the location of the first breakpoint based on one or more analysis parameters.

7. The system of claim 6, the operation further comprising:
halting execution of the executable upon detection of a second breakpoint contained in the executable, comprising:
analyzing a second call stack in the executable;
determining whether each component of the second call stack is identical to each component of the second breakpoint; and
halting execution of the executable responsive to determining that each component of the second call stack is identical to each component of the second breakpoint.

8. The system of claim 6, the operation further comprising:
halting execution of the executable upon detection of a second breakpoint contained in the executable, comprising:
analyzing a second call stack in the executable;
determining whether the second call stack includes a call stack pattern defined as the second breakpoint; and
halting execution of the executable responsive to determining that the second call stack includes the call stack pattern.

9. The system of claim 6, the operation further comprising:
halting execution of the executable upon detection of a second breakpoint contained in the executable, comprising:
analyzing a second call stack in the executable;
determining whether the second call stack matches at least a component of the second breakpoint, where the second breakpoint specifies that execution will halt on a specific call stack within a base class; and
halting execution of the executable responsive to determining that the second call stack contains at least a component of the second breakpoint and is within the base class.

10. The system of claim 6, further comprising:
transferring control from the debug environment to an analysis tool.

11. A computer program product for analyzing a heap following a core dump, the computer program product comprising:
a computer-readable storage medium having computer-readable program code embodied therewith, the computer-readable program code executable by one or more computer processors to:
receive one or more breakpoints defining one or more object-oriented concepts within a call stack;
receive the executable in a debug environment;
execute the executable in the debug environment;
during execution of the executable, analyze a first call stack corresponding to the execution of the executable;
determine that the first call stack includes an object-oriented concept that satisfies a first breakpoint of the one or more breakpoints,
wherein the first breakpoint specifies at least one of an abstraction, an extended class and an interface;
halt execution of the executable upon detection of the object-oriented concept defined by the first breakpoint within the first call stack; and
analyze the executable up to the location of the first breakpoint based on one or more analysis parameters.

12. The computer program product of claim 11, further comprising:
halting execution of the executable upon detection of a second breakpoint contained in the executable, comprising:
analyzing a second call stack in the executable;
determining whether each component of the second call stack is identical to each component of the second breakpoint; and
halting execution of the executable responsive to determining that each component of the second call stack is identical to each component of the second breakpoint.

13. The computer program product of claim 11, further comprising:
halting execution of the executable upon detection of a second breakpoint contained in the executable, comprising:
analyzing a second call stack in the executable;
determining whether the second call stack includes a call stack pattern defined as the second breakpoint; and
halting execution of the executable responsive to determining that the second call stack includes the call stack pattern.

14. The computer program product of claim 11, further comprising:
halting execution of the executable upon detection of a second breakpoint contained in the executable, comprising:
analyzing a second call stack in the executable;
determining whether the second call stack matches at least a component of the second breakpoint, where the second breakpoint specifies that execution will halt on a specific call stack within a base class; and
halting execution of the executable responsive to determining that the second call stack contains at least a component of the second breakpoint and is within the base class.

* * * * *